United States Patent
Lin et al.

(10) Patent No.: US 9,818,018 B2
(45) Date of Patent: Nov. 14, 2017

(54) FLEXIBLE FINGERPRINT SENSOR MATERIALS AND PROCESSES

(71) Applicant: Nanotek Instruments, Inc., Dayton, OH (US)

(72) Inventors: Yi-jun Lin, Taoyuan (TW); Bor Z Jang, Centerville, OH (US); Shaio-Yen Lee, Taipei (TW); Aruna Zhamu, Springboro, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 785 days.

(21) Appl. No.: 14/121,023

(22) Filed: Jul. 22, 2014

(65) Prior Publication Data

US 2016/0026846 A1 Jan. 28, 2016

(51) Int. Cl.
*G06F 3/041* (2006.01)
*G06K 9/00* (2006.01)

(52) U.S. Cl.
CPC ....... *G06K 9/00053* (2013.01); *G06K 9/0002* (2013.01)

(58) Field of Classification Search
CPC ................. H04N 13/0207; H04N 3/1506
See application file for complete search history.

(56) References Cited

U.S. PATENT DOCUMENTS

| | | | |
|---|---|---|---|
| 5,325,442 A | 1/1994 | Knapp et al. | |
| 5,940,526 A | 8/1999 | Setlak et al. | |
| 6,512,381 B2 | 1/2003 | Kramer | |
| 6,636,053 B1 | 10/2003 | Gozzini | |
| 8,564,314 B2 | 10/2013 | Shaikh et al. | |
| 8,736,001 B2 | 5/2014 | Salatino et al. | |
| 8,766,651 B2 | 7/2014 | Kang et al. | |
| 8,772,884 B2 | 7/2014 | Bond et al. | |
| 2005/0172722 A1* | 8/2005 | Kobayashi | G01L 1/14 73/754 |
| 2012/0242635 A1* | 9/2012 | Erhart | G06F 1/1626 345/207 |
| 2013/0181949 A1 | 7/2013 | Setlak et al. | |

* cited by examiner

*Primary Examiner* — Zandra Smith
*Assistant Examiner* — Andre' C Stevenson

(57) ABSTRACT

A flexible fingerprint sensor laminate comprising: a layer of flexible substrate having a front surface and a back surface, at least a domain of electrically conductive material deposited on the front surface, a protective hard coating layer that covers the domain of electrically conductive material, and a plurality of sensor electrodes deposited preferably on the back surface and related circuitry (e.g. integrated circuit for driving and sensing). Preferably, the layer of flexible substrate is no greater than 20 μm in thickness, the domain of electrically conductive material has a thickness no greater than 2 μm, the protective hard coating has a thickness no greater than 1 μm, and the laminate has a surface sheet resistance no greater than 200 Ohm per square and surface scratch resistance no less than 3 H. The laminate exhibits good scratch resistance, low sheet resistance, good flexibility and mechanical integrity. The invention also provides a biometric sensor, such as a fingerprint sensor. The invention further provides a process for producing such a sensor laminate.

29 Claims, 1 Drawing Sheet

FLEXIBLE FINGERPRINT SENSOR MATERIALS AND PROCESSES

FIELD OF THE INVENTION

The present invention relates to the field of fingerprint sensors for personal identification and verification and, more particularly, to fingerprint sensor materials and processes.

BACKGROUND OF THE INVENTION

Fingerprint sensing and matching is widely used for personal identification or verification. A common approach to fingerprint identification involves scanning a sample fingerprint or an image thereof and storing the image and/or unique characteristics of the fingerprint image. The characteristics of a sample fingerprint may be compared to information for reference fingerprints already stored in a database to determine or verify identification of an individual.

A fingerprint sensor is an electronic device used to capture a digital image of the fingerprint pattern. The captured image is called a live scan. This live scan is digitally processed to create a biometric template (a collection of extracted features) which is stored and used for matching. There are four types of more commonly used fingerprint sensor technologies: optical, ultrasonic, radio frequency (RF), and capacitance.

Optical fingerprint sensing involves capturing a digital image of the print using visible light. This type of sensor is essentially a specialized digital camera. In one version, the top layer of the sensor, where the finger is placed, is referred to as the touch surface. Beneath this layer is a light-emitting phosphor layer which illuminates the surface of the finger. The light reflected from the finger passes through the phosphor layer to an array of solid state pixels (a charge-coupled device) which captures a visual image of the fingerprint. This type of sensor has the disadvantage that the imaging capabilities are affected by the quality of skin on the finger. For example, a dirty or marked finger is difficult to image properly. Further, it is possible for a person to erode the outer layer of skin on the fingertips to the point where the fingerprint is no longer visible. The sensor can also be easily fooled by an image of a fingerprint if not coupled with a "live finger" detector. However, unlike capacitive sensors, this sensor technology is not susceptible to electrostatic discharge damage.

An ultrasonic sensor makes use of the principles of ultrasonography in order to create visual images of the fingerprint. The ultrasonic sensor uses very high frequency sound waves to penetrate the epidermal layer of skin. The sound waves are generated using piezoelectric transducers and reflected energy is also measured using piezoelectric materials. Since the dermal skin layer exhibits the same characteristic pattern of the fingerprint, the reflected wave measurements can be used to form an image of the fingerprint. This eliminates the need for clean, undamaged epidermal skin and a clean sensing surface.

A radio-frequency (RF) fingerprint sensor is capable of using RF electric fields to develop an electronic representation of the fingerprint pattern. Such a device can be fabricated as a standard CMOS integrated circuit on a monocrystalline silicon substrate. This process allows the electronic structures required of reading the signal from each of the sensor's pixels or sensing electrodes to be fabricated directly beneath the pixels. Locating the signal conditioning electronics or sense amps under pixel was essential to achieving adequate performance of the circuitry. One such RF fingerprint sensing device is disclosed in U.S. Pat. No. 5,940,526 to Setlak et al. The patent discloses an integrated circuit fingerprint sensor including an array of RF sensing electrodes to provide an image of the fingerprint friction ridges and valleys. More particularly, the RF sensing permits imaging of live tissue just below the surface of the skin to reduce spoofing. In a follow-up patent application, US Pat. Pub. No. 2013/0181949 (Jul. 18, 2013), Setlak discloses an improved fingerprint sensor, which includes pixels, pixel sensing traces each associated with a respective pixel, and electrodes overlying the pixel sensing traces. The finger sensor may also include pixel sensing circuitry coupled to the pixel sensing traces and the electrodes.

A DC capacitance sensor uses capacitance principles to develop fingerprint images. In this method, the sensor array pixels each act as one plate of a parallel-plate capacitor, the dermal layer (which is electrically conductive) acts as the other plate, and the non-conductive epidermal layer acts as a dielectric. A passive capacitance sensor uses the principle described above to form an image of the fingerprint patterns on the dermal layer of skin. Each sensor pixel is used to measure the capacitance at that point of the array. The capacitance varies between the ridges and valleys of the fingerprint due to the notion that the space between the dermal layer and the sensing element in valleys contains an air gap. The dielectric constant of the epidermis and the area of the sensing element are known values. Hence, the measured capacitance values can be used to distinguish between fingerprint ridges and valleys.

An active capacitance sensor uses a charging cycle to apply a voltage to the skin before measurement is conducted. The applied voltage charges the effective capacitor. The electric field between the finger and the sensor follows the pattern of the ridges in the dermal skin layer. During the discharge phase, the voltage across the dermal layer and the sensing element is compared against a reference voltage and the capacitance is computed. The distance values are then calculated and used to form an image of the fingerprint. An active capacitance sensor measures the ridge patterns of the dermal layer like the ultrasonic method. This method obviates the need for clean, undamaged epidermal skin and a clean sensing surface. It may be noted that an active capacitance sensor can makes use of a RF excitation to replace the DC voltage charging.

An example of a capacitance-based fingerprint sensing device is disclosed in U.S. Pat. No. 5,325,442 to Knapp. This device has a row/column array of sensing elements which are coupled to a drive circuit and a sensing circuit by sets of row and column conductors, respectively. The sensing elements are actively addressable by the drive circuit. Each sense element includes a sense electrode and a switching device, such as a thin film transistor (TFT) switching device, for actively addressing that sense electrode. The sense electrodes are covered by an insulating material and are for receiving a finger. Capacitances resulting from individual finger surface portions in combination with sense electrodes are sensed by the sense circuit by applying a voltage to the sense electrodes and measuring charging characteristics.

For detailed configurations of capacitive fingerprint sensors and related circuitry design, please consult the following additional examples: U.S. Pat. No. 8,564,314 (Oct. 22, 2013) issued to J. Shaikh, et al.; US Pat. Pub. No. 2013/0181949 (Jul. 18, 2013) by Setlak; U.S. Pat. No. 8,736,001 (May 27, 2014) issued to M. Salatino, et al.; U.S. Pat. No. 8,766,651 (Jul. 1, 2014) to M. H. Kang, et al.; U.S. Pat. No. 8,772,884 (Jul. 8, 2014) to R. H. Bond, et al.

Current fingerprint sensors are typically implemented on a rigid and brittle substrate (e.g. Si wafer or inorganic glass) having most or all of the sensor components being rigid and/or brittle as well. These rigid components are incompatible with flexible electronics (e.g. the bendable flexible smart phone or wearable device). For instant, in a commonly used design, the fingerprint sensor subsystem contains a laser-cut sapphire crystal plate that fits into a stainless steel detection ring, which in turn is in physical connection with a touch ID sensor and a tactile switch. All these individual components are very rigid and unfit for a flexible device design.

However, the flexible substrate (polymer) based fingerprint sensor has its own intrinsic drawbacks as well. For instance, the polymer, such as polyimide (PI), does not exhibit an adequate scratch or abrasion resistance, which is required of a fingerprint sensor that experiences repeated relative motions/contacts between a finger and a polymer surface. The polymer substrate must also have good mechanical integrity as well as good electrical conductivity (i.e. reduced sheet resistance). This electrical characteristic is essential to form a sensitive and selective capacitance measuring pixel. However, most of the intrinsically conductive polymers are not mechanically robust, sufficient for use as a substrate of a flexible sensor. Most of the mechanically strong polymers are not electrically conductive.

Thus, it is an object of the invention to provide a flexible substrate and related sensor components deposited thereon for use in a biometric sensor, such as a fingerprint sensor. These sensor components, individually or in combination, must be mechanically robust, scratch-resistant, and electrically conducting for reduced impedance and improved sensitivity of the sensor. However, where a finger is touched or swiped, the surface must be electrically insulating and such a skin layer must be as thin as possible. All these seemingly conflicting requirements make the design and production of an assembly containing these components a formidable task.

Hence, a specific object of this invention is to provide a layer of electrically conductive material that is capable of well-adhering to a flexible substrate, and a protective hard coating layer covering this layer of electrically conductive material, resulting in a flexible laminate that meets all the technical requirements of a flexible fingerprint sensor unit or subassembly.

SUMMARY OF THE INVENTION

This invention provides a flexible fingerprint sensor laminate comprising: a layer of flexible substrate having a front surface and a back surface, at least one domain of electrically conductive material deposited on the front surface, a protective hard coating layer that covers the at least one domain of electrically conductive material, and a plurality of sensor electrodes, preferably deposited on the back surface. These sensor electrodes are electronically connected to a circuitry, including a drive circuit and a sensing circuit, among others. Preferably, the layer of flexible substrate is no greater than 50 µm in thickness (preferably less than 20 µm and more preferably less than 10 µm), the one domain or multiple domains of electrically conductive material have a thickness no greater than 10 µm (preferably no greater than 5 µm, more preferably no greater than 2 µm, and most preferably no greater than 1 µm), the protective hard coating has a thickness no greater than 5 µm (preferably no greater than 2 µm, more preferably no greater than 1 µm, further preferably no greater than 0.5 µm, and most preferably no greater than 0.2 µm), and said laminate has a surface sheet resistance no greater than 10,000 Ohm per square (preferably no greater than 500Ω/□, more preferably no greater than 200Ω/□, and most preferably no greater than 100Ω/□).

The present invention also provides a process for producing the flexible sensor laminate described above. The process comprises (a) providing a layer of flexible substrate having a front surface and a back surface; (b) depositing one domain or multiple domains of an electrically conductive material on the front surface (this one domain or multiple domains combined can constitute a layer of conductive material); (c) depositing a protective hard coating layer to cover at least one of the domains (preferably all of the domains) of the electrically conductive material; and (d) implementing a plurality of sensor electrodes to the flexible substrate (e.g. onto the back surface of the flexible surface), wherein the electrodes are configured to enable identification of a fingerprint of a finger placed in a fingerprint sensing area defined on or near the protective hard coating. Steps (b) and/or (c) are preferably followed by a compression step.

In an embodiment, the flexible substrate contains a thin layer of polymer that is preferably 1-50 µm thick, more preferably 1-20 µm, and most preferably 1-10 µm. This flexible polymer may be selected from a polyester (e.g. polyethylene terephthalate (PET), polyethylene naphthalate (PEN), and polyester ionomer), polyethersulfone (PES), polycarbonate (PC), polysulfone, a phenolic resin, an epoxy resin, polyimide, polyether ester, polyetheramide, cellulose nitrate, cellulose acetate, poly(vinyl acetate), polystyrene, polyolefins including polyolefin ionomers, polyamide, aliphatic polyurethane, polyacrylonitrile, polytetrafluoroethylene, polyvinylidene fluoride, poly(methyl methacrylate), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), poly(methyl methacrylate), an acrylate/methacrylate copolymer (PMMA), natural or synthetic paper, resin-coated or laminated paper, or a combination thereof. In a preferred embodiment, the flexible substrate is polyimide or a copolymer thereof. The most preferred flexible plastic substrate is polyimide (PI) due to its superior mechanical and thermal properties as well as its availability in large quantity at a moderate price.

The protective hard coating layer preferably contains an UV radiation-curable, ionizing radiation-curable, or thermally curable resin or lacquer. Preferably, the resin or lacquer is derived from the group consisting of photo polymerizable monomers and oligomers, including acrylates and methacrylates of polyfunctional compounds (such as polyhydric alcohols and their derivatives having (meth) acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth) acrylate, 1,6-hexanediol di(meth)acrylate, or neopentyl glycol di(meth)acrylate and mixtures thereof), acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

In an embodiment, the protective hard coating layer contains an ionizing radiation-curable resin or lacquer that contains a reactive diluent selected from the group consisting of monofunctional monomers (such as ethyl (meth) acrylate, ethylhexyl (meth)acrylate, styrene, vinyltoluene, and N-vinylpyrrolidone), and polyfunctional monomers (for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate).

Alternatively, the protective hard coating layer contains a thermally curable resin or lacquer selected from: (a) a polyfunctional epoxy monomer selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether, and pentaerythritol tetraglycidyl ether; or (b) a bi- or tri-functional epoxy monomer selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane)methyl 3,4-epoxycylohexylcarboxylate and mixtures thereof.

Preferably, the protective coating layer contains some abrasion resistance-enhancing nano particles, such as carbide, nitride, silicide, chalcogenide, and oxide of transition metals, and semiconducting elements (B, Si, Ge, etc.); e.g. silicon carbide, aluminum carbide, aluminum nitride, boron nitride, silicon oxide, zirconia, etc.

Suitable coating methods or processes include doctor-blade coating, bar coating, roll-to-roll process, inkjet printing, screen printing, micro-contact, gravure coating, spray pyrolysis coating, ultrasonic spray coating, electrostatic spray coating, and flexographic printing. These processes can be used to deposit both the protective coating layer and the electrically conductive layer (typically containing an adhesive component and a conductive filler component, such as graphene sheets). Among these, ultrasonic spray coating and electrostatic spray coating are the most preferred processes.

In one embodiment, the domain of electrically conductive material contains a conductive filler selected from: (a) Single-wall carbon nanotube (SWCNT) or multi-wall carbon nanotube (MWCNT), with or without a chemical functionalization group selected from acyl, aryl, aralkyl, halogen, alkyl, amino, halogen, or thiol; (b) Single-layer and/or multi-layer sheets of pristine graphene, graphene oxide, reduced graphene oxide (RGO), CVD-grown graphene, graphene fluoride, hydrogenated graphene, nitrogenated graphene, doped graphene, with or without a chemical functionalization group selected from acyl, aryl, aralkyl, halogen, alkyl, amino, halogen, or thio; (c) Metal nanowire selected from silver (Ag), gold (Au), copper (Cu), platinum (Pt), zinc (Zn), cadmium (Cd), cobalt (Co), molybdenum (Mo), or aluminum (Al); (d) Conducting oxide selected from tin-doped indium oxide, fluorine-doped zinc oxide, aluminum-doped zinc oxide, indium-doped zinc oxide, antimony-doped tin oxide, fluorine-doped tin oxide $SnO_2$, $ZnO_2$, or $In_2O_3$; or (e) Conducting polymer selected from Polydiacetylene, polyacetylene (PAc), polypyrrole (PPy), polyaniline (PAni), polythiophene (PTh), polyisothionaphthene (PITN), polyheteroarylenvinylene (PArV), in which the heteroarylene group can be the thiophene, furan or pyrrole, poly-p-phenylene (PpP), polyphthalocyanine (PPhc) and the like, and their derivatives; wherein the domain of electrically conductive material has a sheet resistance from 1 to 10,000 Ohm per square, preferably from 1 to 500 Ohm per square, and more preferably less than 100 Ohm per square.

In a preferred embodiment, the domain of electrically conductive material further contains an adhesive resin composition used to bond the conductive fillers together and to bond them to the flexible substrate. The adhesive resin may be selected from an ester resin, a urethane resin, a urethane ester resin, an acrylic resin, or an acrylic urethane resin. The adhesive resin composition may include a curing agent and a coupling agent along with the adhesive resin. Examples of the ester resin include neopentyl glycol (NPG), ethylene glycol (EG), isophthalic acid, and terephthalic acid. The coupling agent may include epoxy silane compounds. The curing agent may be present in an amount of 1 to 30 parts by weight based on 100 parts by weight of the adhesive resin. The adhesive resin composition may be heated to a temperature of at least 70° C., preferably of 90° C. to 120° C., for at least 5 minutes, so as to form the adhesive conductive layer.

The present invention also provides a flexible fingerprint sensor comprising a flexible sensor laminate described above, an integrated circuit (IC) coupled to the sensor electrodes for providing an exciting voltage or radio frequency thereto and/or for measuring capacitance, resistance, or impedance values through the sensor electrodes. These sensor electrodes may include exciting (transmitting) electrodes sending out a voltage or a radio frequency wave. These electrodes may include sensing (receiving) electrodes.

In an embodiment, the flexible fingerprint sensor comprises a flexible sensor laminate of the instant invention; a plurality of pixels; a plurality of pixel sensing traces each associated with a respective pixel; a plurality of electrodes overlying the plurality of pixel sensing traces; and pixel sensing circuitry coupled to the plurality of pixel sensing traces and the plurality of electrodes, the pixel sensing circuitry capable of operating in a measurement mode by operating the plurality of pixels so that at least some of the plurality of pixels are active, and at least some other of the plurality of pixels are inactive, coupling pixel sensing traces associated with the inactive pixels to a voltage reference, coupling electrodes associated with the active pixels to the voltage reference, and coupling electrodes associated with the inactive pixels to a drive signal.

The invention also provides a flexible biometric sensor comprising a flexible sensor laminate, an integrated circuit (IC) coupled to the sensor electrodes for driving, sensing, and data analysis. This sensor is capable of sensing and analyzing features of a finger, palm, foot, etc.

DESCRIPTION OF THE PREFERRED EMBODIMENTS

The present invention may be understood more readily by reference to the following detailed description of the invention taken in connection with the accompanying drawing FIGURES, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

A relatively common biometric sensing device is the fingerprint sensor. These devices are used in controlling access to electronic devices, such as computers (including tabletop, laptop, tablet, and palm devices), mobile phones (including smart phones), safes, buildings, vehicles, etc. by scanning a user's fingerprint and comparing it to an authenticating set of fingerprint images. If the proffered (live) fingerprint to be authenticated matches one within a set of pre-enrolled authorized fingerprints, access may be granted. Fingerprint sensors may be stand-alone devices, integrated into other devices such as PC peripherals, or may be integrated into the devices over which they control access. The sensors may be optical or electrical (e.g., resistive, capacitive, etc. using a voltage or RF excitation). Certain configurations of fingerprint sensors are well-described in references, such as US Pat. Pub. No. 2013/0181949 (Jul. 18, 2013) by Setlak; U.S. Pat. No. 8,736,001 (May 27, 2014) issued to M. Salatino, et al.; and U.S. Pat. No. 8,772,884 (Jul. 8, 2014) to R. H. Bond, et al.

Figure 1A:
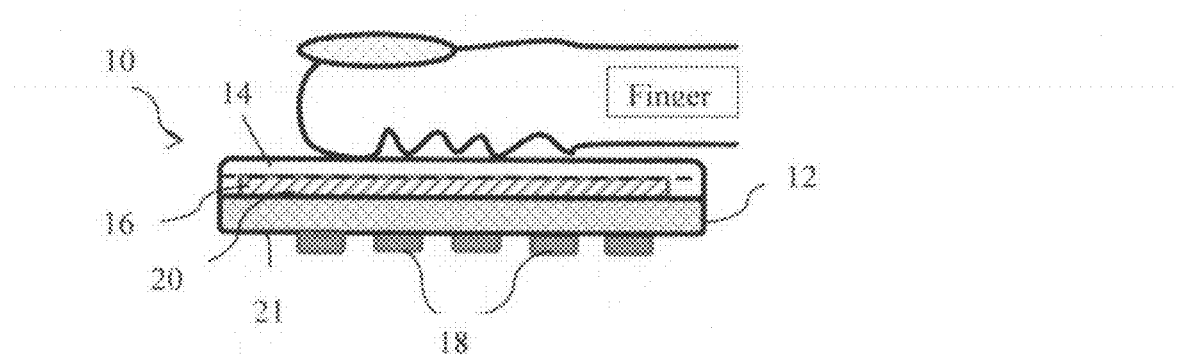
FIG. 1 (A) schematic of a finger placed or being swiped across the front surface of a laminate, as part of a fingerprint sensor; and (B) enlarged version of a laminate composed of a flexible substrate 12, a layer or domain 26 of an electrically conductive material, a protective hard coating 24 covering the domain 26, and the sensor electrodes 28.

As schematically illustrated in FIG. 1(A), the present invention provides a laminate as a sensor unit or subassembly 10 of a flexible biometric sensor, such as a capacitive or RF-based fingerprint sensor. Such a sensor containing this laminate has many advantageous features, such as good scratch resistance, flexibility (can be bent, twisted, curved, etc.), improved sensitivity through reduced overall impedance, and reduced sensor dimensions.

A typical electrical-based fingerprint sensor contains a rigid (non-flexible) semiconductor body (or die), on which is formed an array of sensor elements and related circuitry. When packaged together, the sensor elements are often exposed for contact with a user's finger, or through a thin layer of protective material. Typically, the sensors operate according to principles that use distance between the sensor surface and a region of the user's finger to construct an image of the user's fingerprint. Accurate operation of such sensors requires a minimal gap between the sensor surface and the fingerprint to be sensed. Therefore, the sensor surface itself is most often left uncovered, and a user places a finger directly into contact therewith in the process of fingerprint sensing. However, in the instant fingerprint sensor designs, a thin protective overcoat is deposited over the sensor surface to protect the sensor from physical and environmental damage, wear, etc.

The semiconductor die typically has a sensor array formed on a top surface thereof using photolithographic or other processes. The sensor die is typically very small, with small contact pads, necessitating use of a secondary structure to make practical electrical connections between the die and a printed circuit board (PCB) to which the assembly is attached for use. Such secondary structures include lead frames, chip carriers, and the like. The die is commonly attached to a lead frame, and fine wires (wirebonds) make the electrical interconnections between the micro-scale bonding pads of the die and the macro-scale bonding leads of the lead frame. To protect the wirebonds and other components, the die, lead frame, and wirebonds are typically encased in an encapsulation material.

A number of fingerprint sensor circuit designs operate by injecting a small current into the finger being sensed. One example of such a circuit is disclosed in U.S. Pat. No. 6,512,381, which is incorporated herein by reference. In order to drive the user's finger with the desired current, a contact structure (e.g. as disclosed in U.S. Pat. No. 6,636,053) may be provided. The contact structure may take the form of a bezel located near an edge of the die. The bezel has a generally planar upper surface that is either coplanar with or parallel to the plane of the upper surface of the die. As the user applies a fingertip to the surface of the die, for example by placement on an area sensor or in the swiping motion over a strip sensor, the fingertip is simultaneously in physical and electrical contact with the surface of the die (i.e., the sensor array formed on the top surface of the die) and the bezel, the latter to electrically drive the fingertip during the sensing process.

Traditionally, the bezel and the encapsulated die have each been separate elements, brought together in the process of assembling or packaging the sensor device. In other words, the bezel and die are not encapsulated together. In one known example, the bezel is a metal sheet bent to curl over at its edges, which makes electrical connection with the bottom side of the substrate. The bezel wraps around the sides of the substrate to make a top, contact portion roughly in the plane of the top surface of the encapsulated die. In another example, a metal strip or frame makes contact with the top side of the substrate, and presents a top, contact portion roughly in the plane of the top surface of the encapsulated die. Current fingerprint sensor structures require a number of discrete assembly steps. As the number of discrete elements and manufacturing steps increase, manufacturing cost increases and the potential for faulty or inaccurate assembly that negatively affects product consistency and yield losses increase. Furthermore, the separate bezel and encapsulated die structures lead to undesirably large final devices. It is desired that the bezel be as physically close to the sensors as possible to optimize the sensitivity of the sensor. However, known separate bezel and encapsulated die designs limit possible options of the final device size and sensor-to-bezel spacing.

In a desired configuration, a biometric sensor assembly (such as a fingerprint sensor) comprises a flexible substrate (e.g. a polyimide film) to which is mounted a die containing sensor circuitry and at least one conductive bezel element. A bezel means a unitary, substantially uniformly composed structure, most typically a metal or conductive polymer composite domain. Preferably, the die and the bezel are encased in a unitary encapsulation structure to protect those elements from mechanical, electrical, and environmental damage, yet with a portion of a surface of the die and the bezel thinly covered by the encapsulation or other coating material structure. By encasing both the bezel and the sensor die in the encapsulation structure, those elements may be brought closer together than heretofore possible. In addition, the encapsulation structure physically protects the bezel and sensor die, and in particular maintains the spacing therebetween, in a manner not possible by currently known device designs.

Thus, as illustrated in FIG. 1(A), this invention provides a flexible fingerprint sensor laminate 10 comprising: a layer of flexible substrate 12 having a front surface 20 and a back surface 21, at least one domain 16 of electrically conductive material deposited on the front surface 20, a protective hard coating layer 14 that covers this domain of electrically conductive material, and a plurality of sensor electrodes 18.

This one domain or multiple domains of electrically conductive material can be part of a bezel, an excitation signal reference plane, a reference voltage plate, a conductivity enhancer in a capacitive sensor configuration, etc., depending on the design of a sensor. There can be multiple domains on one plane or on several closely spaced planes. This layer or these multiple layers of conductive domains are implemented very close to the surface where a finger is to be placed or swiped, and are preferably positioned between this finger site and the sensing electrodes with related circuitry.

Figure 1B:
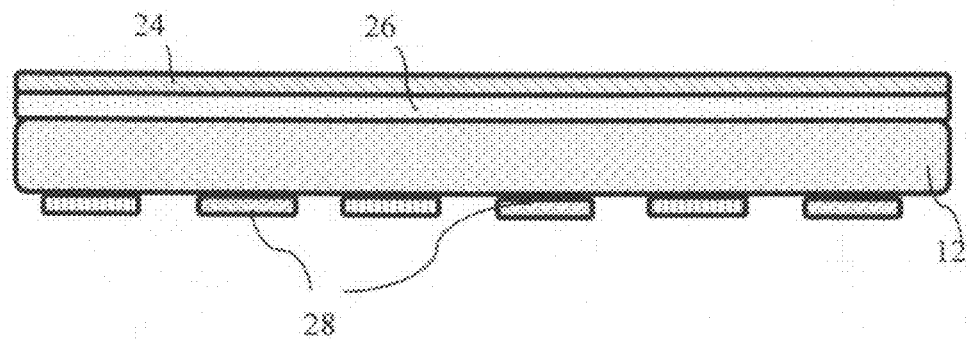

FIG. 1(B) is schematic of an enlarged version of a laminate composed of a flexible substrate 12, a layer or domain 26 of an electrically conductive material, a protective hard coating 24 that covers the entire domain 26, and the sensor electrodes 28, which are electronically connected to a sensing circuitry.

In an embodiment, the flexible substrate contains a thin layer of polymer selected from a polyester (e.g. polyethylene terephthalate (PET), polyethylene naphthalate (PEN), and polyester ionomer), polyethersulfone (PES), polycarbonate (PC), polysulfone, a phenolic resin, an epoxy resin, polyimide, polyether ester, polyetheramide, cellulose nitrate, cellulose acetate, poly(vinyl acetate), polystyrene, polyolefins including polyolefin ionomers, polyamide, aliphatic polyurethane, polyacrylonitrile, polytetrafluoroethylene, polyvinylidene fluoride, poly(methyl methacrylate), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), polyethylene tetrafluoroethylene) fluoropolymer (PETFE), poly(methyl methacrylate), an acrylate/methacrylate copolymer (PMMA), natural or synthetic paper, resin-coated or laminated paper, or a combination thereof. In a preferred embodiment, the flexible substrate is polyimide or a copolymer thereof. The most preferred flexible plastic substrate is polyimide (PI) due to its superior mechanical and thermal properties as well as its availability in large quantity at a moderate price. This polymer is preferably 1-50 μm thick, more preferably 1-20 μm thick, and most preferably 1-10 μm thick.

In one embodiment, the domain(s) of electrically conductive material contain a conductive filler selected from: (a) Single-wall carbon nanotube (SWCNT) or multi-wall carbon nanotube (MWCNT), with or without a chemical functionalization group selected from acyl, aryl, aralkyl, halogen, alkyl, amino, halogen, or thiol; (b) Single-layer and/or multi-layer sheets of pristine graphene, graphene oxide, reduced graphene oxide (RGO), CVD-grown graphene, graphene fluoride, hydrogenated graphene, nitrogenated graphene, doped graphene, with or without a chemical functionalization group selected from acyl, aryl, aralkyl, halogen, alkyl, amino, halogen, or thio; (c) Metal nanowire selected from silver (Ag), gold (Au), copper (Cu), platinum (Pt), zinc (Zn), cadmium (Cd), cobalt (Co), molybdenum (Mo), or aluminum (Al); (d) Conducting oxide selected from tin-doped indium oxide, fluorine-doped zinc oxide, aluminum-doped zinc oxide, indium-doped zinc oxide, antimony-doped tin oxide, fluorine-doped tin oxide $SnO_2$, $ZnO_2$, or $In_2O_3$; or (e) Conducting polymer selected from Poly-diacetylene, polyacetylene (PAc), polypyrrole (PPy), polyaniline (PAni), polythiophene (PTh), polyisothionaphthene (PITN), polyheteroarylenvinylene (PArV), in which the heteroarylene group can be the thiophene, furan or pyrrole, poly-p-phenylene (PpP), polyphthalocyanine (PPhc) and the like, and their derivatives. Desirably, the domain of electrically conductive material has a sheet resistance from 1 to 10,000 Ohm per square, preferably from 1 to 500 Ohm per square, and more preferably less than 100 Ohm per square while maintaining a domain thickness from 100 nm to 10 μm, preferably no greater than 5 μm, more preferably no greater than 2 μM, and most preferably no greater than 1 μm.

In a preferred embodiment, the domain of electrically conductive material further contains an adhesive resin composition used to bond the conductive fillers together and to bond them to the flexible substrate. The conductive filler-adhesive composition may be deposited onto the front surface of the flexible substrate using a coating method or process, such as doctor-blade coating, bar coating, roll-to-roll process, inkjet printing, screen printing, micro-contact, gravure coating, spray pyrolysis coating, ultrasonic spray coating, electrostatic spray coating, and flexographic printing. The preferred processes are ultrasonic spray coating and electrostatic spray coating and the most preferred process is ultrasonic spray coating. Compared with other processes, these two processes produce conductive domains that are better adhered to the flexible substrate, exhibit significantly lower sheet resistance (given the same domain thickness) and, when coupled with the protective coating, provide the highest surface hardness or scratch resistance. The ultrasonic spray coating provides the best overall performance characteristics.

The adhesive resin may be selected from an ester resin, a urethane resin, a urethane ester resin, an acrylic resin, or an acrylic urethane resin. The adhesive resin composition may include a curing agent and a coupling agent along with the adhesive resin. Examples of the ester resin include neopentyl glycol (NPG), ethylene glycol (EG), isophthalic acid, and terephthalic acid. The coupling agent may include epoxy silane compounds. The curing agent may be present in an amount of 1 to 30 parts by weight based on 100 parts by weight of the adhesive resin. The adhesive resin composition may be heated to a temperature of at least 70° C., preferably of 90° C. to 120° C., for at least 5 minutes, so as to form the adhesive conductive layer.

The protective hard coating layer preferably contains an UV radiation-curable, ionizing radiation-curable, or thermally curable resin or lacquer. Suitable coating methods or processes include doctor-blade coating, bar coating, roll-to-roll process, inkjet printing, screen printing, micro-contact, gravure coating, spray pyrolysis coating, ultrasonic spray coating, electrostatic spray coating, and flexographic printing. Again, the preferred processes are ultrasonic spray coating and electrostatic spray coating and the most preferred process is ultrasonic spray coating. The ultrasonic spray coating provides the best overall performance characteristics.

The thickness of the protective hard coating is preferably from 10 nm to 2 μm, preferably no greater than 1 μm, more preferably no greater than 0.5 μm, and most preferably no greater than 0.2 μm or 200 nm. The sum of the protective hard coating thickness and the conductive domain thickness is preferably no greater than 5 μm, more preferably no greater than 2 μm, and most preferably no greater than 1.5 μm while the combined layer exhibits a scratch resistance no less than 2 H (as measured by an ASTM pencil scratching method), preferably and typically 3 H or higher, further preferably and typically 4 H or higher. Some layer compositions exhibit a scratch resistance or hardness as high as 6 H.

Preferably, the resin or lacquer is derived from the group consisting of photo polymerizable monomers and oligomers, including acrylates and methacrylates of polyfunctional compounds (such as polyhydric alcohols and their derivatives having (meth)acrylate functional groups such as ethoxylated trimethylolpropane tri(meth)acrylate, tripropylene glycol di(meth)acrylate, trimethylolpropane tri(meth) acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth) acrylate, or neopentyl glycol di(meth)acrylate and mixtures thereof), acrylate and methacrylate oligomers derived from low-molecular weight polyester resin, polyether resin, epoxy resin, polyurethane resin, alkyd resin, spiroacetal resin, epoxy acrylates, polybutadiene resin, and polythiolpolyene resin.

The UV polymerizable monomers and oligomers are coated and dried, and subsequently exposed to UV radiation to form an optically clear cross-linked abrasion resistant layer. The preferred UV cure dosage is between 50 and 1,000 mJ/cm$^2$.

In an embodiment, the protective hard coating layer contains an ionizing radiation-curable resin or lacquer that contains a reactive diluent selected from the group consisting of monofunctional monomers (such as ethyl (meth) acrylate, ethylhexyl (meth)acrylate, styrene, vinyltoluene, and N-vinylpyrrolidone), and polyfunctional monomers (for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate).

Alternatively, the protective hard coating layer contains a thermally curable resin or lacquer selected from: (a) a polyfunctional epoxy monomer selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether, and pentaerythritol tetraglycidyl ether; or (b) a bi- or tri-functional epoxy monomer selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures thereof.

Advantageously, the heat-curable compositions of the present invention further contain small amounts, preferably from 0.05 to 0.20% by weight, of at least one surface active compound. The surface active agent is important for good wetting of the substrate resulting in satisfactory cosmetics of the final hard-coating.

The layers coated with the heat-curable composition are preferably heated to a temperature of at least 70° C., preferably of 90° C. to 120° C., for at least 5 minutes to form a hard coating layer. The thickness of the hard coat layer is generally about 0.1 to 10 micrometers (μm), preferably 0.2 to 5 μm, more preferably 0.2 to 2 and most preferably from 0.2 to 1.0 μm.

In a preferred embodiment, the protective hard coating layer further contains a nano-scaled filler (abrasion resistance-enhancing particle) having a thickness or diameter less than 100 nm. The nano-scaled filler, having a thickness or diameter less than 100 nm, may be selected from ceramic, glass, carbon, metal, metal oxide, metal carbide, metal nitride, metal silicide, meal chalcogenide, or metal halogenide. They can be in the form of nano sheets, nano tubes, nano wires, nano platelets, nano belts, nano ribbons, nano rods, etc.

The nanoparticles for abrasion resistance enhancement are typically inorganic particles. Examples of inorganic particles include inorganic oxides such as alumina, tin oxide, antimony oxide, silica (SiO, $SiO_2$), zirconia, titania, ferrite, as well as mixtures, or mixed oxides; metal vanadate, metal tungstate, metal phosphate, metal nitrate, metal sulfate, metal carbide, and the like.

An inorganic oxide sol can be used to obtain inorganic oxide nanoparticles. In the case of silica nanoparticles, for example, a silica sol obtained using liquid glass (sodium silicate solution) as a starting material can be used. A silica sol obtained from liquid glass may have a very narrow particle size distribution depending on the manufacturing conditions; therefore, when such a silica sol is used, a hard coat having desired characteristics can be obtained by more accurately controlling the filling rate of nanoparticles in the hard coat.

The surface of the nanoparticles may be modified using a surface treatment agent as necessary. A surface treatment agent typically has a first terminal bonding to the particle surface (via covalent bonds, ionic bonds, or strong physisorption) and a second terminal which gives the particles compatibility with resins and/or reacts with resins during curing. Examples of surface treatment agents include alcohols, amines, carboxylic acids, sulfonic acids, phosphonic acids, silanes, and titanates. The preferred type of treatment agent is determined, in part, by the chemical nature of the nanoparticle surface. When silica or another siliceous filler are used as nanoparticles, a silane is preferable.

Silanes and carboxylic acids are preferred for metal oxides. Surface modification may be performed before, during, or after mixing with a curable monomer or a curable oligomer. When a silane is used, the reaction between the silane and the nanoparticle surface is preferably performed before mixing with the curable monomer or the curable oligomer. The required amount of the surface treating agent is determined by several factors, such as the particle size and type of the nanoparticles and the molecular weight and type of the surface treating agent. It is preferable for one layer of a surface treating agent to be deposited onto the surface of the particles. The required deposition procedure or reaction conditions are also determined by the surface treating agent that is used. When silane is used, it is preferable to perform surface treatment for approximately 1 to 24 hours at a high temperature under acidic or basic conditions. A high temperature or long period of time is typically unnecessary in the case of a surface treating agent such as a carboxylic acid Examples of surface treating agents include compounds such as isooctyltrimethoxysilane, polyalkyleneoxide alkoxysilane, N-(3-triethoxysilyl propyl) methoxyethoxy ethoxyethyl carbamate, 3-(methacryloyloxy) propyl trimethoxysilane, 3-(acryloyloxy) propyl trimethoxysilane, 3-(methacryloyloxy) propyl triethoxysilane, 3-(methacryloyloxy) propyl methyl dimethoxysilane, 3-(acryloyloxy) propyl methyl dimethoxysilane, 3-(methacryloyloxy)propyl dimethyl ethoxysilane, 3-(methacryloyloxy) propyl dimethyl ethoxysilane, vinyl dimethyl ethoxysilane, phenyl trimethoxysilane, n-octyl trimethoxysilane, dodecyl trimethoxysilane, octadecyl trimethoxysilane, propyl trimethoxysilane, hexyl trimethoxysilane, vinyl methyl diacetoxysilane, vinyl methyl diethoxysilane, vinyl triacetoxysilane, vinyl triethoxysilane, vinyl triisopropoxysilane, vinyl trimethoxysilane, vinyl triphenoxysilane, vinyl tri(t-butoxy) silane, vinyl tri(isobutoxy) silane, vinyl triisopropenoxysilane, vinyl tris-(2-methoxyethoxy) silane, styryl ethyl trimethoxysilane, mercapto propyl trimethoxysilane, 3-glycidoxy propyl trimethoxysilane, acrylic acid, methacrylic acid, oleic acid, stearic acid, dodecanoic acid, 2-[2-(2-methoxyethoxy)ethoxy]acetic acid (MEEAA), β-carboxyethyl acrylate, 2-(2-methoxyethoxy) acetic acid, and methoxy phenyl acetic acid and mixtures.

The nanoparticle mixture contained in the hard coat preferably constitutes from approximately 10 to 95 mass % of the entire mass of the hard coat and, in several embodiments, constitutes from approximately 20 to 90 mass % or from approximately 30 to 60 mass % of the entire mass of the hard coat.

Since all constituent layers are made of flexible materials and are ultra-thin, the resulting laminate is very flexible. We have also found the laminate to be of excellent structural integrity.

In summary, the present invention provides a process for producing the flexible sensor laminate described above. The process comprises (a) providing a layer of flexible substrate having a front surface and a back surface; (b) depositing one domain or multiple domains of an electrically conductive material on the front surface (this one domain or multiple domains combined can constitute a layer of conductive material); (c) depositing a protective hard coating layer to cover at least one of the domains (preferably all of the domains) of the electrically conductive material; and (d) implementing a plurality of sensor electrodes to the flexible substrate (e.g. onto the back surface of the flexible surface), wherein the electrodes are configured to enable identification of a fingerprint of a finger placed in a fingerprint sensing area defined on or near the protective hard coating.

In a preferred embodiment, step (b) and/or step (c) is followed by a step of compressing or roll-pressing the one domain or multiple domains of an electrically conductive material and/or the protective hard coating.

In one embodiment, step (b) includes preparing a first suspension of at least a first conductive filler and an adhesive resin and then dispensing the first suspension for forming the one domain or multiple domains of an electrically conductive material. In a relatively simple but not preferred process, step (b) includes preparing a suspension of a first conductive filler, at least a second conductive filler, and an adhesive resin, and dispensing the suspension for forming the one domain or multiple domains of an electrically conductive material.

In one embodiment, step (b) includes (i) preparing a first suspension of at least a first conductive filler and an adhesive resin, (ii) preparing a second suspension of a second conductive filler, (iii) mixing this first suspension and the second suspension to form a mixture suspension, and (iv) dispensing the mixture suspension for forming the one domain or multiple domains of an electrically conductive material.

Alternatively and preferably, step (b) includes (i) preparing a first suspension of at least a first conductive filler and an adhesive resin, (ii) preparing a second suspension of a second conductive filler, (iii) dispensing this first suspension to form a domain or multiple domains of this first conductive filler and resin, and (iv) sequentially or concurrently dispensing the second suspension to a surface of the domain or multiple domains of the first conductive filler and resin for forming the desired one domain or multiple domains of the electrically conductive material.

In the process, step (b) or step (c) includes using a coating method or process selected from doctor-blade coating, bar coating, roll-to-roll printing, inkjet printing, screen printing, micro-contact printing, gravure coating, spray pyrolysis coating, ultrasonic spray coating, electrostatic spray coating, or flexographic printing. Most preferred processes are inkjet printing, screen printing, ultrasonic spray coating, and electrostatic spray coating.

The present invention also provides a flexible fingerprint sensor comprising a flexible sensor laminate described above, an integrated circuit (IC) coupled to the sensor electrodes for providing an exciting voltage or radio frequency thereto and/or for measuring capacitance, resistance, or impedance values through the sensor electrodes. These sensor electrodes may include exciting (transmitting) electrodes sending out a voltage or a radio frequency wave. These electrodes may include sensing (receiving) electrodes. Sensing electrodes and ICs or other sensing circuitry are well-known in the art.

In an embodiment, the flexible fingerprint sensor comprises a flexible sensor laminate of the instant invention; a plurality of pixels; a plurality of pixel sensing traces each associated with a respective pixel; a plurality of electrodes overlying the plurality of pixel sensing traces; and pixel sensing circuitry coupled to the plurality of pixel sensing traces and the plurality of electrodes, the pixel sensing circuitry capable of operating in a measurement mode by operating the plurality of pixels so that at least some of the plurality of pixels are active, and at least some other of the plurality of pixels are inactive, coupling pixel sensing traces associated with the inactive pixels to a voltage reference, coupling electrodes associated with the active pixels to the voltage reference, and coupling electrodes associated with the inactive pixels to a drive signal.

The invention also provides a flexible biometric sensor comprising a flexible sensor laminate, an integrated circuit (IC) coupled to the sensor electrodes for driving, sensing, and data analysis. This sensor is capable of sensing and analyzing features of a finger, palm, foot, etc.

The following examples are given to illustrate the best modes of practice and not intended to be construed as limiting the scope of the invention.

EXAMPLE 1

Layer (Domains) of a Conductive Material with No Coverage by a Protective Hard Coating A typical procedure of producing a flexible laminate for a fingerprint sensor is described as follows: In one example, approximately 0.249 g of multi-layer graphene sheets (supplied by Angstron Materials, Inc., Dayton, Ohio, USA) was added to 2.25 g, 1.125% HPMC (Hydroxypropyl Methyl Cellulose) and then mixed with 0.35 g PES 20 (polyether sulfone) solution and 1.45 g, 1.5% silver nanowires (AgNW) to produce a conductive dispersion (suspension). The resulting suspension has a concentration of 5.8% graphene, 8.14% PES 20, 33.7% AgNW, 13% IPA, 38.7% $H_2O$.

To prepare conductive films on polyimide (PI) substrates, we treated substrates with UV/Ozone or corona to make a low surface energy surface for improved wetting by the suspension when coated thereon and for improved adhesion between the substrate and graphene-AgNW conductive layer. The conductive dispersion was deposited onto the PI film by a bar coating process; the film had a wet film thickness of 60 μm and was dried at 120° C. for 3 min. Several types of conductive layers containing other types of conductive fillers, summarized in Table 1 below, were prepared in a similar manner.

The resulting laminate was evaluated to obtain layer thickness, surface resistance, surface hardness or scratch resistance (using an ASTM D3363 Standard Test Method for Film Hardness by Pencil Test), and adhesion between layers (ASTM D3359 tape test). The evaluation results are summarized in Table 1 below:

sion of metal nanowires (AgNW or CuNW) or carbon nanotube/fiber (CNT or CNF) were prepared separately. For instance, 3.03 g graphene was dispersed in 30.07 g PET resin (Hank RZ 570) to produce a suspension having a graphene concentration of 9.15% by weight mixed with 90.85% PET resin. This is herein referred to as Suspension A. A suspension of AgNW or CuNW in a liquid mixture of methanol and water (Methanol: $H_2O$=1:1) was prepared to produce a nanowire concentration of 0.065% by weight. This is referred to as Suspension B. Two mixing/coating routes were then followed: (a) Suspension A and Suspension B are mixed first, followed by coating onto a solid substrate surface; (b) Suspension A and Suspension B were coated sequentially, one after another, onto a solid surface.

On a separate basis, an UV-curable hard coating resin was prepared by mixing, for instance, 0.2 g Epoxy resin (K-500) mixed with 3.31 g Acrylic resin (R44-234) in a co-solvent of

TABLE 1 laminate evaluation results

| Sample ID | Substrate | Conductive domain | Protective coating | Thickness (Conductive + overcoat layers) | Surface resistance ($\Omega/\square$) | Pencil hardness | Adhesion |
|---|---|---|---|---|---|---|---|
| 1-A | PI | Graphene + AgNW + PES | none | 7.4 μm | 30 | 1H-2H | 1B |
| 1-B | PI | Graphene + CuNW + PES | none | 7.5 μm | 62 | 1H-2H | 1B |
| 1-C | PI | MWCNT + AgNW + PES | none | 7.4 μm | 48 | 1H-2H | 1B |
| 1-D | PI | ITO-coated graphene sheets + PES | none | 7.0 μm | 42 | 1H-2H | 1B |
| 1-E | PI | Graphene (RGO) | none | 6.8 μm | 98 | 1H-2H | 1B |
| 1-F | PI | MWCNT | none | 7.2 μm | 124 | 1H-2H | 1B |

These data indicate that graphene is a superior conductive additive, significantly better than multi-walled carbon nanotubes (MWCNT). A combination of graphene and silver nanowires (AgNW) provides the best (lowest) sheet resistance. However, without a protective overcoat, the layer of conductive material alone falls short of providing adequate surface scratch resistance and adhesion.

EXAMPLE 2

Layer of a Conductive Material with a Protective Hard Coating

In this series of examples, a thin layer of resin or resin-filler composite was applied as a protective hard coating. In this series, the suspension of graphene (or MWCNT, other fibrous conductive fillers) and the suspen- 8.83 g to obtain a 1.62% concentration of UV-curable hard coat resin. This is referred to as Suspension C.

To prepare conductive films on PI and PET substrates, we treated substrates with UV/Ozone or corona to make a low surface energy surface for improved wetting by the graphene suspension when coated thereon and for improved adhesion between the substrate and the conductive layer. In one example, the graphene dispersion (Suspension A) was coated on the PI or PET film by a bar coating process (wet film thickness of 60 μm). Then, AgNW dispersion (Suspension B) was deposited onto the graphene films by a spray coating process and dried at 120° C. for 5 min. After drying, UV-curable hard coat resin (Suspension C) was coated onto the AgNW-graphene layers by bar coating process (wet film thickness of 2 μm), then dried at 110° C. for 3 min, and subsequently exposed to UV radiation for 30 seconds to form an optically clear cross-linked abrasion resistant layer.

The preferred UV cure dosage is 100 mJ/cm$^2$.

TABLE 2 laminate evaluation results

| ID | Substrate | Conductive domain | Protective coating | Thickness (Conductive + overcoat layers) | Surf. resist. ($\Omega/\square$) | Pencil hardness | Adh. |
|---|---|---|---|---|---|---|---|
| 2-A | PI | Bar coating of graphene/PET, then spray coating of AgNW | UV-curable, bar coating | 6.5 μm | 70 | 3H | 2B |
| 2-B | PI | Mixing of Graphene/PET & AgNW suspensions, followed by spray coating | UV-curable, bar coating | 6.5 μm | 81 | 2H | <2B |
| 2-C | PI | Mixing of Graphene/PET & AgNW suspensions, followed by bar coating | UV-curable, bar coating | 6.6 μm | 94 | 2H | <2B |
| 2-D | PI | Bar coating of CNT/PET, then spray coating of AgNW | UV-curable, bar coating | 6.8 μm | 135 | 2H | <2B |
| 2-E | PET | Bar coating of CNT/PET, then spray coating of AgNW | UV-curable, bar coating | 6.8 μm | 137 | 2H | <2B |
| 2-F | PET | Bar coating of graphene/PET, then spray coating of CNT | UV-curable, bar coating | 6.8 μm | 112 | 2H | <2B |

These data demonstrate several unexpected results: (a) the graphene/AgNW combination provides the best conductive filler for the conductive material domains or layer; (b) separate deposition steps of graphene/binder and nanowire suspensions results in a significantly better laminate (e.g. Sample 2-A) than the route of mixing the two suspensions, followed by deposition (e.g. Samples 2-B and 2-C); and (c) spray coating is better than bar coating for depositing the layer of a conductive material.

EXAMPLE 3

Spray-Coated Conductive Layers Covered by a UV-Cured Protective Coating

In one of this series of samples, graphene dispersion (Suspension A) was prepared by dispersing 3.03 g of graphene (Angstron N006) in 30.07 g PET resin (Hank RZ 570), which was diluted with 15.8 g IPA and 31.6 g H$_2$O to produce a suspension with a graphene concentration of 3.76%, and PET resin of 37.3%. Suspension B was made in a way similar to that in Example 2 to produce a suspension containing a 0.065% concentration of AgNW in liquid medium (Methanol: H$_2$O=1:1). Suspension C was obtained by mixing 0.2 g epoxy resin (K-500) with 3.31 g acrylic resin (R44-234) in 8.83 g of a co-solvent, forming a 1.62% concentration of UV-curable hard coat resin.

To prepare conductive graphene films on solid substrates, the substrate was treated with UV/Ozone to make low surface energy surface for graphene spray-coating layer. In one example, graphene dispersion (Suspension A) was spray-coated on the PI film. Then, AgNW dispersion (Suspension B) was deposited onto the graphene film by a spray coating process and dried at 120° C. for 5 min. After drying, UV-curable hard coat resin (Suspension C) was coated onto the AgNW-graphene layer by a bar coating process (forming a wet film thickness of 2 μm), then dried at 110° C. for 3 min, and subsequently exposed to UV radiation for 30 seconds to form an optically clear cross-linked, abrasion resistant layer. The preferred UV cure dosage is 100 mJ/cm$^2$.

TABLE 3 laminate evaluation results

| ID | Substrate | Layer of conductive material (Conductive domains) | Protective coating | Thickness (Conductive + overcoat layers) | Surf. resist. ($\Omega/\square$) | Pencil hardness | Adh. |
|---|---|---|---|---|---|---|---|
| 3-A | PI | Spray coating of pristine graphene/PET, then ultrasonic spray coating of AgNW | UV-curable, bar coating | 8.5 μm | 60 | 3H-4H | 3B-4B |
| 3-B | PI | Spray coating of RGO/PET, then spray coating of AgNW | UV-curable, bar coating | 8.6 μm | 75 | 3H-4H | 3B-4B |
| 3-C | PI | Spray coating of GO/PET, then spray coating of AgNW | UV-curable, bar coating | 8.6 μm | 90 | 3H | 3B-4B |
| 3-D | PI | Spray coating of amino-functionalized graphene/PET, then spray coating of AgNW | UV-curable, bar coating | 8.4 μm | 84 | 4H | 4B |
| 3-E | PES | Spray coating of aryl-functionalized graphene/PET, then spray coating of AgNW | UV-curable, bar coating | 8.4 μm | 88 | 4H | 4B |

These data indicate that (a) pristine graphene is better than graphene oxide (GO) and reduced graphene oxide (RGO) in terms of achieving a reduced surface resistance; (b) chemically functionalized graphene leads to a better surface scratch resistance and layer adhesion. The thickness range 8.4-8.6 μm in these laminates is too thick, however.

EXAMPLE 4

Thinner Spray-Coated Conductive Layers Covered by a UV-Cured Protective Coating

A more dilute graphene suspension (Suspension A) was then produced by dispersing 0.32 g of graphene in 13.11 g PET resin (Hank RZ 570), which was then diluted with 28.85 g IPA and 57.71 g $H_2O$ to produce a concentration of 0.32% graphene and 13.11% PET resin in the liquid medium. Suspension B was made in a way similar to that in Example 2 to produce a suspension containing a 0.065% concentration of AgNW in liquid medium (Methanol: $H_2O$=1:1). Suspension C was obtained by mixing 0.2 g epoxy resin (K-500) with 3.31 g acrylic resin (R44-234) in 8.83 g of a co-solvent, forming a 1.62% concentration of UV-curable hard coat resin.

To prepare conductive graphene films on solid substrates, the substrate was treated with UV/Ozone to make low surface energy surface for graphene spray-coating layer. In one example, graphene dispersion (Suspension A) was spray-coated on the PI film. Then, AgNW dispersion (Suspension B) was deposited onto the graphene film by a spray coating process and dried at 120° C. for 5 min. After drying, UV-curable hard coat resin (Suspension C) was coated onto the AgNW-graphene layer by a bar coating process (forming a wet film thickness of 2 μm), then dried at 110° C. for 3 min, and subsequently exposed to UV radiation for 30 seconds to form an optically clear cross-linked, abrasion resistant layer. The preferred UV cure dosage is 100 mJ/cm². In some of the samples, the UV curing of the protective coating was followed by a roll-pressing (compressing) treatment to reduce the overall coating thickness.

TABLE 4 laminate evaluation results

| ID | Substrate | Layer of conductive material (Conductive domains) | Protective coating | Thickness (Conductive + overcoat layers) | Surf. resist. (Ω/□) | Pencil hardness | Adh. |
|---|---|---|---|---|---|---|---|
| 4-A | PI | Spray coating of pristine graphene/PET, then ultrasonic spray coating of AgNW | UV-curable, bar coating | 4.1 μm | 80 | 3H-4H | 3B-4B |
| 4-B | PI | Spray coating of pristine graphene/PET, then spray coating of AgNW | UV-curable, bar coating, compression | 2.52 μm | 35 | 3H-4H | 3B-4B |
| 4-C | PC | Spray coating of pristine graphene/PET, then spray coating of CNT | UV-curable, bar coating | 4.3 μm | 105 | 3H-4H | 3B-4B |
| 4-D | PC | Spray coating of pristine graphene/PET, then spray coating of CNT | UV-curable, bar coating, compression | 2.7 μm | 75 | 3H-4H | 3B-4B |

These data indicate that, with proper concentrations and coating processes for the conductive layer and the protective coating layer, the resulting laminate can meet all the technical requirements, plus maintaining a relatively low thickness. A compression step conducted after completed curing of the protective hard coating layer can be a critical step in helping to achieve good laminate performance.

EXAMPLE 5

Thin Spray-Coated Conductive Layers Covered by a Thermally- or Radiation-Cured Protective Coating A graphene suspension (Suspension A) was then produced by dispersing 0.65 g of graphene in 13.06 g PET resin (Hank RZ 570), which was then diluted with 28.76 g IPA and 57.71 g $H_2O$ to produce a concentration of 0.65% graphene and 13.06% PET resin in the liquid medium. Suspension B was made in a way similar to that in Example 2 to produce a suspension containing a 0.065% concentration of AgNW in liquid medium (Methanol: $H_2O$=1:1). Suspension C was obtained by mixing 0.53 g epoxy resin (K-500) with 3.31 g acrylic resin (R44-234) in 8.83 g of a, co-solvent, forming a 4.44% concentration of thermal-curable hard coat resin.

To prepare conductive graphene films on solid substrates, the substrate was treated with UV/Ozone to make low surface energy surface for graphene spray-coating layer. In one example, graphene dispersion (Suspension A) was spray-coated on the PI film. Then, AgNW dispersion (Suspension B) was deposited onto the graphene film by a spray coating process and dried at 120° C. for 5 min. After drying, thermal-curable hard coat resin (Suspension C) was coated onto the AgNW-graphene layers by a bar coating process (wet film thickness of 2 μm), then dried at 90° C. for 3 min

TABLE 5 laminate evaluation results

| ID | Substrate | Layer of conductive material (Conductive domains) | Protective coating | Thickness (Conductive + overcoat layers) | Surf. resist. (Ω/□) | Pencil hardness | Adh. |
|---|---|---|---|---|---|---|---|
| 5-A | PI | Spray coating of pristine graphene/PET, then spray coating of AgNW | Heat-curable, spray coating | 2.3 μm | 81 | 3H-4H | 3B-4B |
| 5-B | PI | Spray coating of pristine graphene/PET, then spray coating of AgNW | Heat-curable, spray coating, compression | 2.1 μm | 60 | 3H-4H | 3B-4B |
| 5-C | PA | Spray coating of pristine graphene/PET, then spray coating of CNT | Heat-curable, spray coating | 3.3 μm | 95 | 3H-4H | 3B-4B |
| 5-D | PA | Spray coating of pristine graphene/PET, then spray coating of CNT | Radiation-curable, spray coating, compression | 2.5 μm | 86 | 3H-4H | 3B-4B |

PA = polyamide

These data indicate that the presently invented laminate compositions and related processes enable us to produce a fingerprint sensor laminate that meets all the technical requirement even though the two coating layers (conducting domain layer and protective hard coating layer) combined have a thickness as low as 2.1-3.3 μm. It may be noted that the sheet resistance of a sheet of material is inversely proportional to the layer thickness. Thus, presumably one could reduce the sheet resistance by increasing the sheet thickness; but, the flexible fingerprint sensor requires any layer to be as thin as possible. The notion that an ultra-thin coating can achieve a relatively low sheet resistance (in unit of (Ω/□) is a major achievement that is indeed highly unexpected.

EXAMPLE 6

Thin Spray-Coated Conductive Layers Covered by an UV-Cured Protective Coating Containing an Abrasion Resistance-Enhancing Filler A more dilute graphene suspension (Suspension A) was then produced by dispersing 0.32 g of graphene in 13.11 g PET resin (Hank RZ 570), which was then diluted with 28.85 g IPA and 57.71 g $H_2O$ to produce a concentration of 0.32% graphene and 13.11% PET resin in the liquid medium. Suspension B was made in a way similar to that in Example 2 to produce a suspension containing a 1.0% concentration of AgNW in liquid medium (Methanol: $H_2O$=1:1).

Suspension C was obtained by mixing 0.2 g epoxy resin (K-500) with 3.31 g acrylic resin (R44-234) in 8.83 g of a co-solvent, forming a 1.62% concentration of UV-curable hard coat resin. A series of nano particles (each of 2-50%) was added to the resin formulation for the purpose of achieving significantly higher surface hardness or scratch resistance. These nano particles include $SiO_2$ particles (20 nm in diameter), BN flakes (approximately 2-20 nm in thickness), nano-clay platelets (1-10 nm in thickness), and single-layer graphene sheets (0.34 nm thick from Angstron Materials, Inc.)

To prepare conductive graphene films on solid substrates, the substrate was treated with UV/Ozone to make low surface energy surface for graphene spray-coating layer. In one example, graphene dispersion (Suspension A) was spray-coated on the PI film. Then, AgNW dispersion (Suspension B) was deposited onto the graphene film by a spray coating process and dried at 120° C. for 5 min. After drying, UV-curable hard coat resin (Suspension C) was coated onto the AgNW-graphene layer by a bar coating process (forming a wet film thickness of 2 μm), then dried at 110° C. for 3 min, and subsequently exposed to UV radiation for 30 seconds to form an optically clear, chemically cross-linked, abrasion resistant layer. The preferred UV cure dosage is 100 mJ/cm². In some of the samples, the UV curing of the protective coating was followed by a roll-pressing (compressing) treatment to reduce the overall coating thickness.

TABLE 6 laminate evaluation results

| ID | Substrate | Layer of conductive material (Conductive domains) | Protective coating | Thickness (Conductive + overcoat layers) | Surf. resist. (Ω/□) | Pencil hardness |
|---|---|---|---|---|---|---|
| 6-A | PI | Spray coating of pristine graphene/PET, then spray coating of AgNW | UV-curable, spray coating | 1.9 μm | 82 | 3H-4H |
| 6-B | PI | Spray coating of pristine graphene/PET, then spray coating of AgNW | UV-curable (containing 30 nm $SiO_2$), spray coating, compression | 1.8 μm | 88 | 4H-5H |
| 6-C | PC | Spray coating of pristine graphene/PET, then spray coating of CuNW | UV-curable, (containing NB), spray coating, compression | 1.5 μm | 195 | 5H-6H |

TABLE 6-continued laminate evaluation results

| ID | Substrate | Layer of conductive material (Conductive domains) | Protective coating | Thickness (Conductive + overcoat layers) | Surf. resist. (Ω/□) | Pencil hardness |
|---|---|---|---|---|---|---|
| 6-D | PC | Spray coating of pristine graphene/PET, then spray coating of CuNW | UV-curable, (containing nano clay), spray coating, compression | 2.1 μm | 191 | 5H-6H |
| 6-E | PC | Spray coating of pristine graphene/PET, then spray coating of AgNW | UV-curable, (containing graphene), spray coating, compression | 1.9 μm | 78 | 4H-5H |
| 6-F | PI | Spray coating of pristine graphene/PET, then spray coating of AgNW | Radiation-curable (containing 1μ SiO$_2$), spray coating, compression | 2.1 μm | 92 | 4H |

These data demonstrate that by adding some nano particles into the protective coating layer one can significantly increase the surface scratch resistance of the resulting laminate.

The invention claimed is:

1. A flexible fingerprint sensor laminate comprising: a layer of flexible substrate having a front surface and a back surface, one domain or multiple domains of electrically conductive material deposited on said front surface, a protective hard coating layer that covers at least one domain of electrically conductive material, and a plurality of sensor electrodes configured to enable identification of a fingerprint of a finger placed in a fingerprint sensing area defined on or near said protective hard coating, wherein said layer of flexible substrate is no greater than 50 μm in thickness, said one domain or multiple domains of electrically conductive material have a thickness no greater than 10 μm, said protective hard coating has a thickness no greater than 5 μm, and said laminate has a surface sheet resistance no greater than 10,000 Ohm per square and surface scratch resistance no less than 2 H measured by an ASTM pencil scratch test.

2. The flexible fingerprint sensor laminate of claim 1, wherein said plurality of sensor electrodes are in a form of multiple rows/columns deposited on said back surface of the flexible substrate and electronically connected to an integrated circuit.

3. The flexible fingerprint sensor laminate of claim 1, wherein said layer of flexible substrate is no greater than 20 μm in thickness, said one domain or multiple domains of electrically conductive material have a thickness no greater than 5 μm, said protective hard coating has a thickness no greater than 2 μm, and said laminate has a surface sheet resistance no greater than 500 Ohm per square and surface scratch resistance no less than 3 H.

4. The flexible fingerprint sensor laminate of claim 1, wherein said layer of flexible substrate is no greater than 20 μm in thickness, said one domain or multiple domains of electrically conductive material have a thickness no greater than 2 μm, said protective hard coating has a thickness no greater than 1 μm, and said laminate has a surface sheet resistance no greater than 200 Ohm per square and surface scratch resistance no less than 3 H.

5. The flexible fingerprint sensor laminate of claim 1, wherein said layer of flexible substrate is no greater than 15 μm in thickness, said one domain or multiple domains of electrically conductive material have a thickness no greater than 1.5 μm, said protective hard coating has a thickness no greater than 0.5 μm, and/or said laminate has a surface sheet resistance no greater than 200 Ohm per square or surface scratch resistance no less than 3 H.

6. The flexible fingerprint sensor laminate of claim 1, wherein said layer of flexible substrate is no greater than 10 μm in thickness, said one domain or multiple domains of electrically conductive material have a thickness no greater than 1.5 μm, said protective hard coating has a thickness no greater than 0.5 μm, and/or said laminate has a surface sheet resistance no greater than 100 Ohm per square and/or surface scratch resistance no less than 4 H.

7. The flexible fingerprint sensor laminate of claim 1, wherein said flexible substrate contains a polymer selected from a polyester, polyethylene terephthalate (PET), polyethylene naphthalate (PEN), polyester ionomer, polyethersulfone (PES), polycarbonate (PC), polysulfone, a phenolic resin, an epoxy resin, polyimide, polyether ester, polyetheramide, cellulose nitrate, cellulose acetate, poly(vinyl acetate), polystyrene, polyolefin, polyolefin ionomer, polyamide, aliphatic polyurethane, polyacrylonitrile, polytetrafluoroethylene, polyvinylidene fluoride, poly(methyl methacrylate), an aliphatic or cyclic polyolefin, polyarylate (PAR), polyetherimide (PEI), polyethersulphone (PES), polyimide (PI), polytetrafluoroethylene, poly(perfluoro-alboxy) fluoropolymer (PFA), poly(ether ether ketone) (PEEK), poly(ether ketone) (PEK), poly(ethylene tetrafluoroethylene)fluoropolymer (PETFE), poly(methyl methacrylate), an acrylate/methacrylate copolymer (PMMA), natural or synthetic paper, resin-coated or laminated paper, or a combination thereof.

8. The flexible fingerprint sensor laminate of claim 1, wherein said flexible substrate is polyimide or a copolymer thereof.

9. The flexible fingerprint sensor laminate of claim 1, wherein said protective hard coating layer contains an UV radiation-curable, ionizing radiation-curable, or thermally curable resin or lacquer.

10. The flexible fingerprint sensor laminate of claim 9, wherein said resin or lacquer is derived from the group of photo polymerizable monomers and oligomers, selected from acrylates and methacrylates of polyfunctional compounds, polyhydric alcohols and their derivatives having (meth)acrylate functional groups, ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)

acrylate, 1,6-hexanediol di(meth)acrylate, or neopentyl glycol di(meth)acrylate, acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

11. The flexible fingerprint sensor laminate of claim 1, wherein said protective hard coating layer contains an ionizing radiation-curable resin or lacquer that contains a reactive diluent selected from the group consisting of monofunctional monomers, including ethyl (meth)acrylate, ethylhexyl (meth)acrylate, styrene, vinyltoluene, and N-vinylpyrrolidone, and polyfunctional monomers, including trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate), and combinations thereof.

12. The flexible fingerprint sensor laminate of claim 1, wherein said protective hard coating layer contains a thermally curable resin or lacquer selected from:
    (a) a polyfunctional epoxy monomer selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether, and pentaerythritol tetraglycidyl ether; or
    (b) a bi- or tri-functional epoxy monomer selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol-A diglycidyl ether, (3,4-Epoxycyclohexane) methyl 3,4-epoxycylohexylcarboxylate and mixtures thereof.

13. The flexible fingerprint sensor laminate of claim 9, wherein said protective hard coating layer further contains a nano-scaled filler having a thickness or diameter less than 100 nm.

14. The flexible fingerprint sensor laminate of claim 9, wherein said protective hard coating layer further contains a nano-scaled filler, having a thickness or diameter less than 100 nm, selected from ceramic, glass, carbon, metal, metal oxide, metal carbide, metal nitride, metal silicide, meal chalcogenide, or metal halogenide.

15. The flexible fingerprint sensor laminate of claim 1, wherein at least one domain of electrically conductive material contains a conductive filler selected from:
    (a) single-wall carbon nanotube (SWCNT) or multi-wall carbon nanotube (MWCNT), with or without a chemical functionalization group selected from acyl, aryl, aralkyl, halogen, alkyl, amino, halogen, or thiol;
    (b) single-layer and/or multi-layer sheets of pristine graphene, graphene oxide, reduced graphene oxide (RGO), CVD-grown graphene, graphene fluoride, hydrogenated graphene, nitrogenated graphene, doped graphene, with or without a chemical functionalization group selected from acyl, aryl, aralkyl, halogen, alkyl, amino, halogen, or thio;
    (c) metal nanowire selected from silver (Ag), gold (Au), copper (Cu), platinum (Pt), zinc (Zn), cadmium (Cd), cobalt (Co), molybdenum (Mo), or aluminum (Al);
    (d) conducting oxide selected from tin-doped indium oxide, fluorine-doped zinc oxide, aluminum-doped zinc oxide, indium-doped zinc oxide, antimony-doped tin oxide, fluorine-doped tin oxide $SnO_2$, $ZnO_2$, or $In_2O_3$; or
    (e) conducting polymer selected from Polydiacetylene, polyacetylene (PAc), polypyrrole (PPy), polyaniline (PAni), polythiophene (PTh), polyisothionaphthene (PITN), polyheteroarylenvinylene (PArV), in which the heteroarylene group can be the thiophene, furan or pyrrole, poly-p-phenylene (PpP), polyphthalocyanine (PPhc) and the like, and their derivatives;
wherein said domain of electrically conductive material has a sheet resistance from 1 to 10,000 Ohm per square.

16. The flexible fingerprint sensor laminate of claim 13, wherein at least one domain of electrically conductive material has a sheet resistance from 1 to 100 Ohm per square.

17. The flexible fingerprint sensor laminate of claim 1, wherein said domain of electrically conductive material further contains an adhesive resin.

18. The flexible fingerprint sensor laminate of claim 15, wherein said adhesive resin is selected from an ester resin, a urethane resin, a urethane ester resin, an acrylic resin, or an acrylic urethane resin.

19. A flexible fingerprint sensor comprising a flexible sensor laminate of claim 1, an integrated circuit (IC) coupled to said sensor electrodes for providing an exciting voltage or radio frequency thereto and/or for measuring capacitance, resistance, or impedance values through said sensor electrodes.

20. A flexible fingerprint sensor comprising a flexible sensor laminate of claim 1; a plurality of pixels; a plurality of pixel sensing traces each associated with a respective pixel; a plurality of electrodes overlying said plurality of pixel sensing traces; and pixel sensing circuitry coupled to said plurality of pixel sensing traces and said plurality of electrodes, said pixel sensing circuitry capable of operating in a measurement mode by operating said plurality of pixels so that at least some of said plurality of pixels are active, and at least some other of said plurality of pixels are inactive, coupling pixel sensing traces associated with said inactive pixels to a voltage reference, coupling electrodes associated with said active pixels to the voltage reference, and coupling electrodes associated with said inactive pixels to a drive signal.

21. A flexible biometric sensor comprising a flexible sensor laminate of claim 1, an integrated circuit (IC) coupled to said sensor electrodes for driving, sensing, and data analysis.

22. A process for producing the flexible sensor laminate of claim 1, said process comprising:
    (a) providing a layer of flexible substrate having a front surface and a back surface;
    (b) depositing one domain or multiple domains of an electrically conductive material on said front surface;
    (c) depositing a protective hard coating layer to cover at least one of said domains of electrically conductive material; and
    (d) implementing a plurality of sensor electrodes to said flexible substrate, wherein said electrodes are configured to enable identification of a fingerprint of a finger placed in a fingerprint sensing area defined on or near said protective hard coating.

23. The process of claim 22, wherein said step (b) and/or step (c) is followed by a step of compressing or roll-pressing said one domain or multiple domains of an electrically conductive material or said protective hard coating.

24. The process of claim 22, wherein said step (b) includes preparing a first suspension of at least a first conductive filler and an adhesive resin and dispensing said first suspension for forming said one domain or multiple domains of an electrically conductive material.

25. The process of claim 22, wherein said step (b) includes preparing a first suspension of at least a first conductive filler and an adhesive resin, preparing a second suspension of a second conductive filler, mixing said first suspension and said second suspension to form a mixture suspension, and dispensing said mixture suspension for forming said one domain or multiple domains of an electrically conductive material.

26. The process of claim 22, wherein said step (b) includes preparing a first suspension of at least a first conductive filler and an adhesive resin, preparing a second suspension of a second conductive filler, dispensing said first suspension to form a domain or multiple domains of said first conductive filler and resin, and sequentially or concurrently dispensing said second suspension to a surface of said domain or multiple domains of said first conductive filler and resin for forming said one domain or multiple domains of said electrically conductive material.

27. The process of claim 22, wherein said step (b) includes preparing a suspension of a first conductive filler, at least a second conductive filler, and an adhesive resin, and dispensing said suspension for forming said one domain or multiple domains of an electrically conductive material.

28. The process of claim 22, wherein said step (b) or step (c) includes using a coating method or process selected from doctor-blade coating, bar coating, roll-to-roll printing, inkjet printing, screen printing, micro-contact printing, gravure coating, spray pyrolysis coating, ultrasonic spray coating, electrostatic spray coating, or flexographic printing.

29. The process of claim 26, wherein at least a step of dispensing involves using inkjet printing, screen printing, ultrasonic spray coating, or electrostatic spray coating.

\* \* \* \* \*